UNITED STATES PATENT OFFICE.

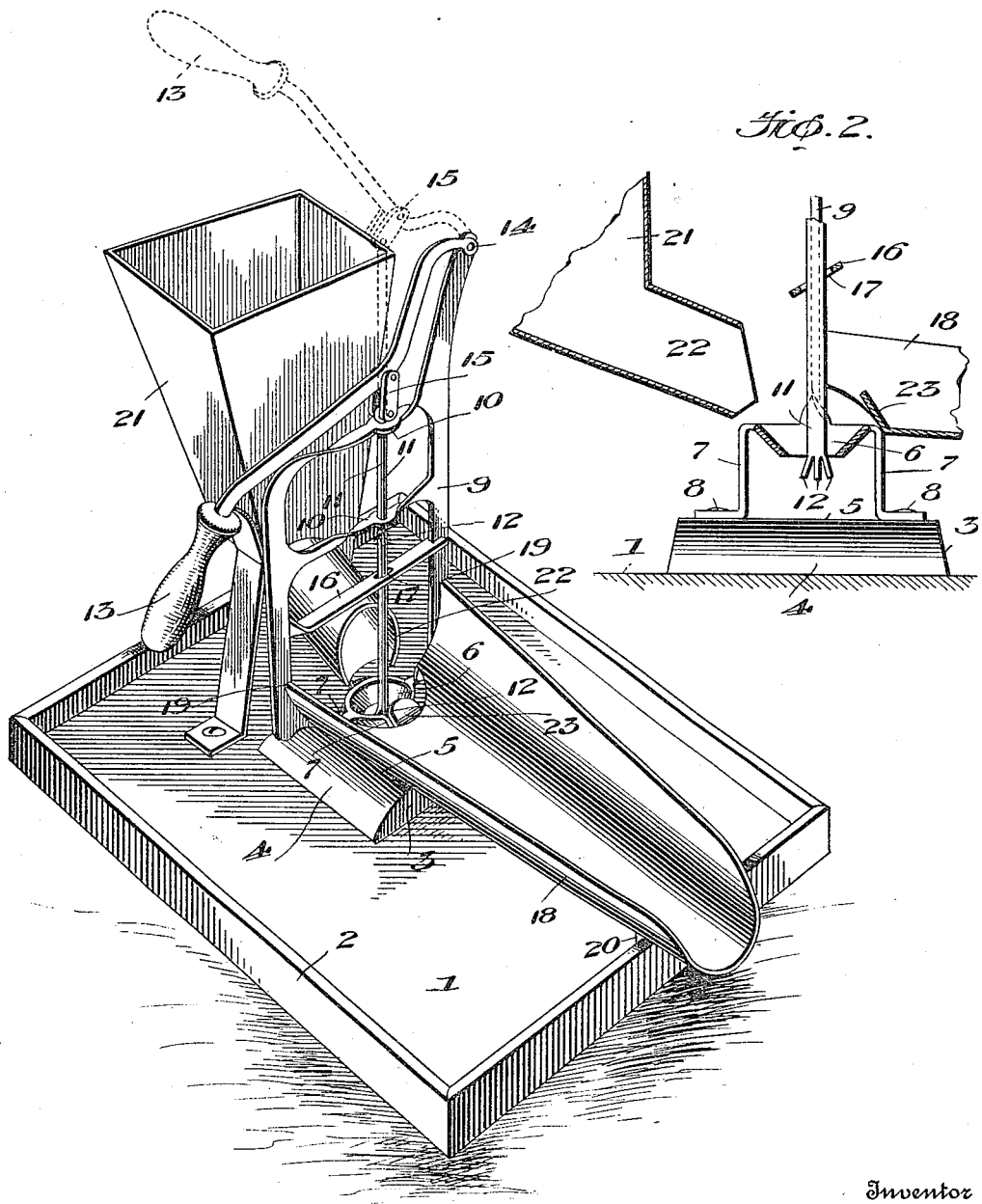

WILHELM MURI, OF STOCKTON, CALIFORNIA.

CHERRY-PITTER.

1,141,355.  Specification of Letters Patent.  Patented June 1, 1915.

Application filed December 8, 1914. Serial No. 876,138.

*To all whom it may concern:*

Be it known that I, WILHELM MURI, a citizen of the United States, residing at Stockton, county of San Joaquin, and State of California, have invented certain new and useful Improvements in Cherry-Pitters, of which the following is a specification.

This invention relates to cherry pitters.

My object is to provide a cherry pitter embodying improvements, whereby the cherries will be automatically fed, one at a time, to position for pitting and by a complete operation will be pitted, the pit discarded and the pitted cherry automatically discharged into a take-off spout.

My invention consists of a fruit pitter having the combination of parts set forth in the appended claim.

I am aware that my invention is susceptible of several modifications within the spirit and scope thereof and, further, that by changes of size or other minor changes, the invention can be adapted for pitting other fruits than cherries.

One embodiment of the invention is set forth fully hereinafter.

In the accompanying drawings: Figure 1 is a perspective of the complete invention; and Fig. 2, a detail section, with parts broken away, through the holder, hopper outlet, and receiving spout.

The operative parts are preferably mounted on a tray 1 which is provided with a raised ledge 2 to retain the pits.

Rising from the tray 1 is a diverter 3 which has inclined sides 4 meeting at a ridge 5 and adapted to cause the pit to roll to one side or the other and prevent accumulation of the pits.

Secured to the diverter, or to the tray proper, is a ring-shaped holder 6 whose legs 7 may be secured in any desired manner, as for instance, by screws 8. The ring-shaped holder 6 is of cup form with an open bottom sufficiently large to permit free passage of the pit.

Rising from the holder 6 or from the tray 1, as preferred, is a frame 9 which has guides 10 in which the pitter 11 is adapted to slide vertically. The pitter is provided with outwardly diverging prongs 12 at its lower end which are adapted to readily enter the fruit and to force out the pit therefrom which then passes through the open bottom of the holder 6 and is caused to roll to one side or the other by the diverter. Any suitable means may be provided for reciprocating the pitter 11, a convenient device being a handle 13 pivoted at 14 and connected by pivoted links 15 to the pitter.

Carried by the frame 9 is a stripper or discharger 16 which has an opening 17 through which the pitter may pass when completely elevated so that the cherry or other fruit clinging to the prongs 12 will be stripped from them and discharged. This discharger or stripper consists of a flat piece of material whose plane is disposed angularly to that of the frame 9 and in general angular relation to the length of the pitter 11. By preference, the angle is substantially 60° to the plane of the frame 9 and pitter 11, but I do not limit myself to any specific angle and any angle is within the scope of my invention in this respect if it is sufficient to cause the pitted cherry or fruit to be discharged laterally or in an offset relation to the frame and pitter. Such discharge is an improvement in that it causes the pitted fruit to be passed to one side and prevented from dropping back into the holder 6, which it would naturally do if means were not provided for deflecting it.

To catch the pitted cherries after they have been stripped from the prongs 12, I provide an inclined trough 18 which may be supported in any desired manner, as for instance, by connection to the frame 9 at 19 and to the tray at 20. This trough is preferably in the form of a spout whose walls converge so that the pitted cherries will readily pass down it.

The stripper or discharger 16 overhangs the inner end of the trough 18 and consequently the pitted fruit drops into said trough (Fig. 2).

I provide a hopper 21 having converging walls and an inclined spout bottom 22 which is disposed adjacent the holder 6 and is of such size as to permit the cherries to pass therefrom, one at a time, in succession and to naturally fall into the holder, while, at the same time, being arranged so that the cherry which is in the holder serves as an abutment for those which are in feeding position in the spout and, consequently, the cherries are only fed one at a time, but as soon as a cherry has been pitted and the pitter is raised by operating the handle, the holder then being clear, another cherry will enter said holder for a repetition of the operation.

Preferably, the spout 18 is provided with a lip 23 located adjacent the holder 6 to resist the pressure of the cherries in the hopper on the one which is in the holder. The lip 23 also insures against the pitted fruit failing to enter the spout 18 (Fig. 2).

Having thus described my invention, what I claim as new and desire to secure by Letters Patent, is:

In a fruit pitter, the combination with a fruit holder, of a hopper having a discharge opening correlated to the holder in such manner that the fruits are adapted to pass by gravity into the holder, one at a time, and to be blocked or restrained by a fruit when the latter is in the holder, a discharge spout having an upwardly extending inclined lip adapted to engage the fruit in the holder, means for pitting the fruit when in the holder, and an inclined stripper arranged above said lip for discharging the pitted fruit into the spout, said lip also being adapted to insure the entry of the stripped fruit into the spout.

In testimony whereof, I hereunto affix my signature in presence of two witnesses.

WILHELM MURI.

Witnesses:
M. R. SAUNDERS,
E. A. HOYE.

Copies of this patent may be obtained for five cents each, by addressing the "Commissioner of Patents, Washington, D. C."